United States Patent
Park et al.

(10) Patent No.: US 11,279,306 B2
(45) Date of Patent: Mar. 22, 2022

(54) FRONT END STRUCTURE FOR A VEHICLE

(71) Applicants: HYUNDAI MOTOR COMPANY, Seoul (KR); KIA MOTORS CORPORATION, Seoul (KR)

(72) Inventors: Myeong Woo Park, Seoul (KR); Jai Hak Kim, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 20 days.

(21) Appl. No.: 16/912,431

(22) Filed: Jun. 25, 2020

(65) Prior Publication Data

US 2021/0138985 A1    May 13, 2021

(30) Foreign Application Priority Data

Nov. 11, 2019  (KR) .................. 10-2019-0143688

(51) Int. Cl.
*B60R 19/52*   (2006.01)
*B60K 11/08*   (2006.01)
*B62D 25/08*   (2006.01)

(52) U.S. Cl.
CPC .............. *B60R 19/52* (2013.01); *B60K 11/08* (2013.01); *B62D 25/08* (2013.01); *B60R 2019/527* (2013.01)

(58) Field of Classification Search
CPC .............. B60R 19/52; B60R 2019/525; B60R 2019/527; B60K 11/08; B62D 25/08
See application file for complete search history.

(56) References Cited

U.S. PATENT DOCUMENTS

| | | | |
|---|---|---|---|
| 4,944,540 A * | 7/1990 | Mansoor | B60K 11/08 180/68.6 |
| 7,766,111 B2 * | 8/2010 | Guilfoyle | B60K 11/085 180/68.1 |
| 10,391,858 B2 | 8/2019 | Jeong | |
| 2013/0285397 A1 * | 10/2013 | Ito | B60K 11/04 293/113 |
| 2019/0061515 A1 | 2/2019 | Jeong | |

FOREIGN PATENT DOCUMENTS

KR    20190023204 A    3/2019

* cited by examiner

*Primary Examiner* — Lori L Lyjak
(74) *Attorney, Agent, or Firm* — Lempia Summerfield Katz LLC

(57) ABSTRACT

A front end structure for a vehicle includes a front end body having a front end surface and a grille body having a plurality of openings. The grille body is mounted to be movable with respect to the front end body. The grille body is movable between a position close to the front end surface of the front end body and a position recessed from the front end surface of the front end body.

9 Claims, 6 Drawing Sheets

FRONT END STRUCTURE FOR A VEHICLE

CROSS-REFERENCE TO RELATED APPLICATION

This application is based on and claims the benefit of priority to Korean Patent Application No. 10-2019-0143688, filed on Nov. 11, 2019, in the Korean Intellectual Property Office, the disclosure of which is incorporated herein in its entirety by reference.

TECHNICAL FIELD

The present disclosure relates to a front end structure for a vehicle, and more particularly, to a front end structure for a vehicle, in which a grille body is movable in a driving direction (or longitudinal direction) of the vehicle at a front end of the vehicle, thereby improving aerodynamic performance and cooling performance.

BACKGROUND

A grille is mounted at a front end of a vehicle. The grille has a plurality of openings that permit ambient air to flow into an engine compartment. The grille may be mounted at the front end of the vehicle to protect an engine, a radiator, and the like in the engine compartment.

The engine for driving the vehicle and various types of heat exchangers such as a radiator, an intercooler, an evaporator, and a condenser are mounted in the engine compartment.

When the ambient air is introduced into the grille through the openings, the ambient air flows into the engine compartment so that the engine or the heat exchangers may be properly cooled. As the temperature of the engine compartment is reduced, heat damage may be prevented.

When the vehicle is running at low speed, the amount of ambient air flowing into the engine compartment through the openings of the grille may be relatively small. When the vehicle is running at high speed, the amount of ambient air flowing into the engine compartment through the openings of the grille may be relatively large.

When the amount of ambient air flowing into the engine compartment through the openings of the grille is relatively large, cooling performance (and heat damage prevention) may be improved, but aerodynamic performance of the vehicle may be reduced due to the increased air flow rate. On the other hand, when the amount of ambient air flowing into the engine compartment through the openings of the grille is relatively small, cooling performance (and heat damage prevention) may be reduced, but aerodynamic performance of the vehicle may be improved.

As the vehicle speed changes, the ambient air flow rate may change, which may result in a conflict between cooling performance and aerodynamic performance.

To solve this problem, an active air flap system or active grille shutter system, which adjusts the opening and closing of an air flap depending on vehicle speed, ambient air temperature, and the like, may be applied to appropriately adjust an ambient air flow rate or an ambient air flow direction, thereby reliably improving cooling performance and aerodynamic performance.

However, an active air flap system according to the related art has a complex configuration of a motor for driving an air flap, a support structure for supporting the movement of the air flap, and the like, which may cause excessive power waste of the motor, increase manufacturing cost, and increase the weight of the vehicle.

In addition, the active air flap system according to the related art may suffer from breakage of the air flap, and accordingly require an additional sensor for sensing the breakage of the air flap, which may further increase the manufacturing cost.

Furthermore, the active air flap system according to the related art is configured to always open at least some openings of the grille in preparation for a failure of the air flap, which may reduce the operating efficiency of the active air flap system.

If the active air flap system according to the related art is mounted on a mesh-type grille, the flap extending in a horizontal direction (vehicle width direction) or a vertical direction (vehicle height direction) may be exposed even when the active air flap system does not operate. The exposed flap may degrade exterior styling. In addition, the opening area of the grille may be relatively narrowed, resulting in poor air flow.

The above information described in this background section is provided to assist in understanding the background of the inventive concept, and may include any technical concept which is not considered as the prior art that is already known to those having ordinary skill in the art.

SUMMARY

The present disclosure has been made to solve the above-mentioned problems occurring in the prior art while advantages achieved by the prior art are maintained intact.

An aspect of the present disclosure provides a front end structure for a vehicle, in which a grille body having a plurality of openings is movable with respect to a front end body of the vehicle in a longitudinal direction (or driving direction) of the vehicle, thereby improving aerodynamic performance and cooling performance.

According to an aspect of the present disclosure, a front end structure for a vehicle may include: a front end body having a front end surface; and a grille body having a plurality of openings and mounted to be movable with respect to the front end body.

The grille body may be movable between a position close to the front end surface of the front end body and a position recessed from the front end surface of the front end body.

The front end structure may further include a guide member configured to guide a movement of the grille body.

The front end body may have a front compartment configured to receive a plurality of heat exchangers. The grille body may have an extension portion extending toward the front compartment. A movement of the extension portion may be guided by the guide member.

The guide member may have a stopper configured to restrict a movement position of the grille body.

The front end structure may further include an actuator configured to move the grille body.

The front end body may include a bumper cover.

The bumper cover may have a grille opening. The grille body may be movably received in the grille opening.

The bumper cover may have a bumper portion adjacent to the grille opening.

The front end structure may further include a controller to control the actuator to move the grille body depending on conditions of the vehicle.

BRIEF DESCRIPTION OF THE DRAWINGS

The above and other objects, features and advantages of the present disclosure are more apparent from the following detailed description taken in conjunction with the accompanying drawings.

DETAILED DESCRIPTION

Figure 1:
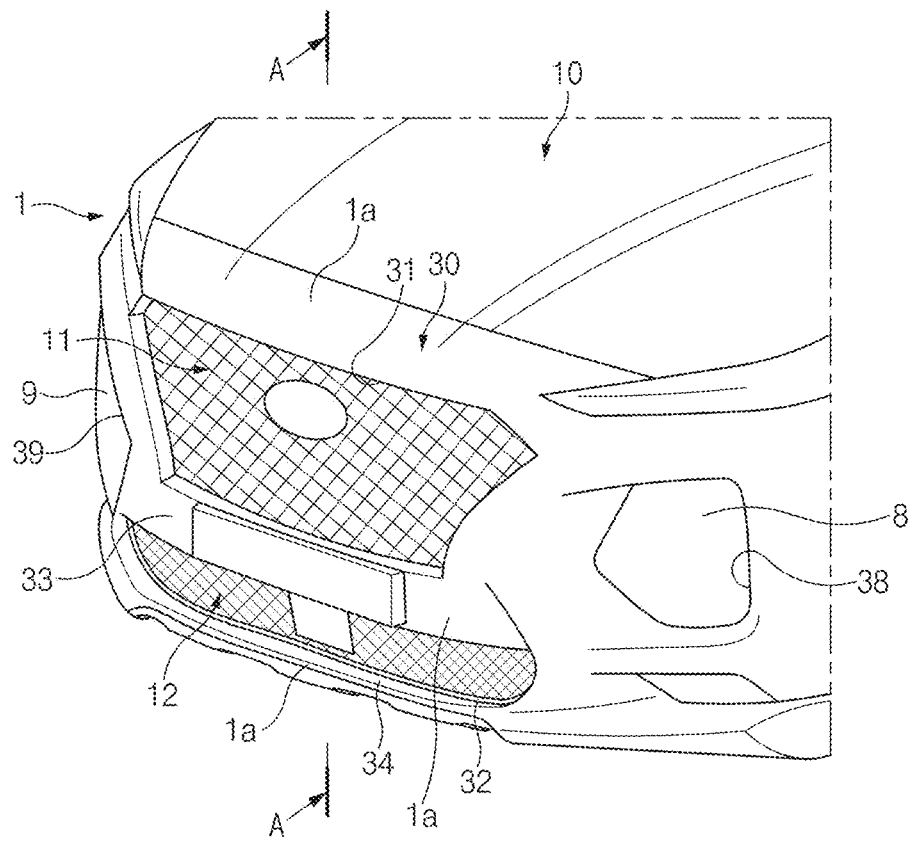
FIG. 1 illustrates a perspective view of a front end structure for a vehicle according to an embodiment of the present disclosure.

Hereinafter, embodiments of the present disclosure are described in detail with reference to the accompanying drawings. In the drawings, the same reference numerals are used throughout to designate the same or equivalent elements. In addition, a detailed description of well-known techniques associated with the present disclosure are ruled out in order not to unnecessarily obscure the gist of the present disclosure.

Terms such as first, second, A, B, (a), and (b) may be used to describe the elements in embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a front end structure 10 for a vehicle, according to an embodiment of the present disclosure, may include a front end body 1 and one or more grille bodies 11 and 12, which are movable with respect to the front end body 1 in a longitudinal direction (or driving direction) of the vehicle.

The front end body 1 may have a front end surface 1a exposed to the outside of the vehicle. A front compartment 5 may be defined as the interior space of the front end body 1. The front compartment 5 may receive an engine, a power module (an electric motor, an inverter, and the like), and the like. For example, the front compartment 5 in an internal combustion engine vehicle may receive an internal combustion engine and its relevant components. The front compartment 5 in an electric vehicle may receive electronic components such as a power unit (an electric motor, a reduction gear), an inverter, a circuit box, and a PTC heater.

The front compartment 5 may receive a plurality of heat exchangers such as an intercooler 6, a condenser 7a, a radiator 7b, and a cooling fan 7c forcibly drawing ambient air to the plurality of heat exchangers.

Figure 2:
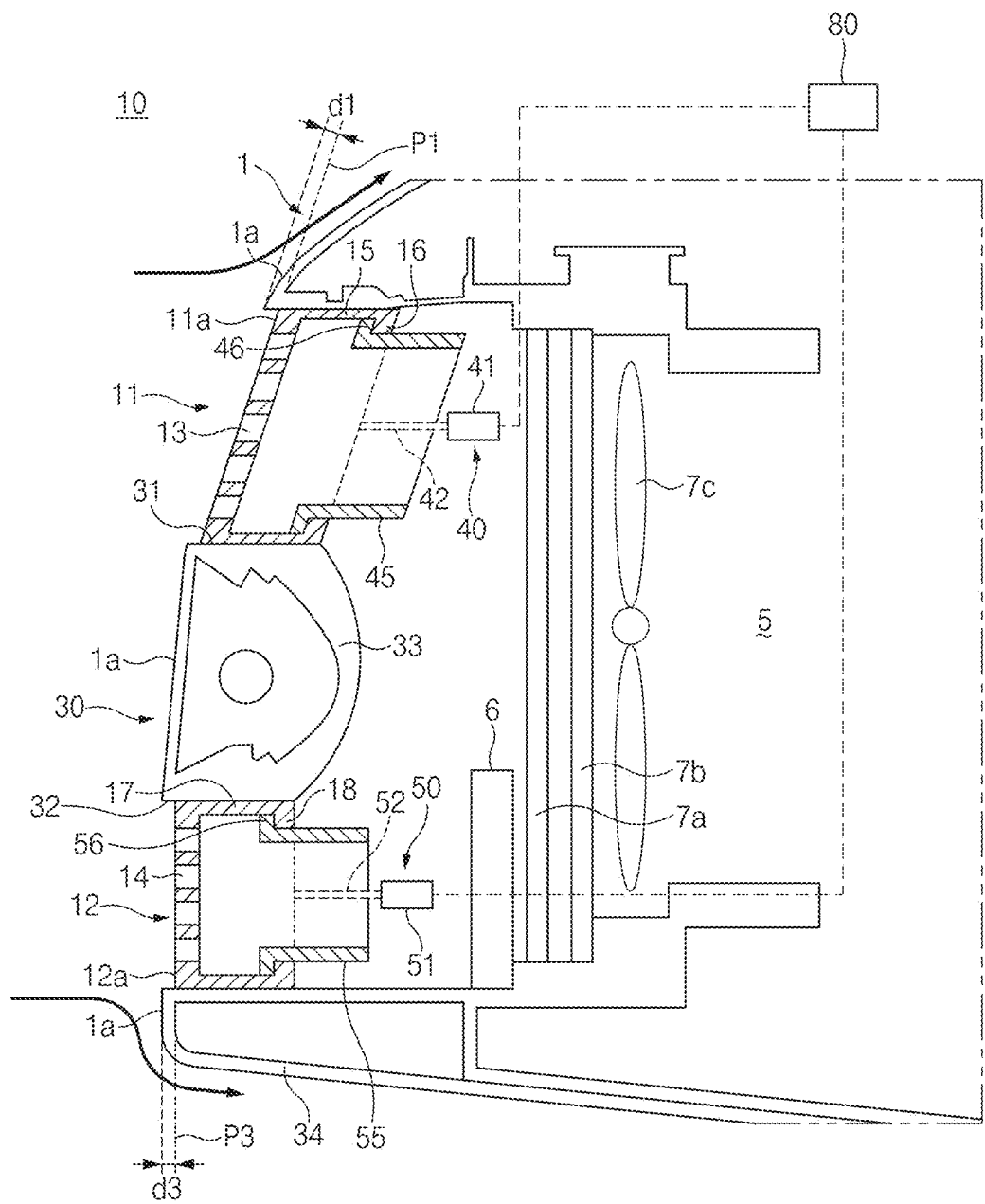
FIG. 2 illustrates a cross-sectional view, taken along line A-A of FIG. 1, in a state in which an upper grille body is in a first position and a lower grille body is in a third position.
Figure 3:
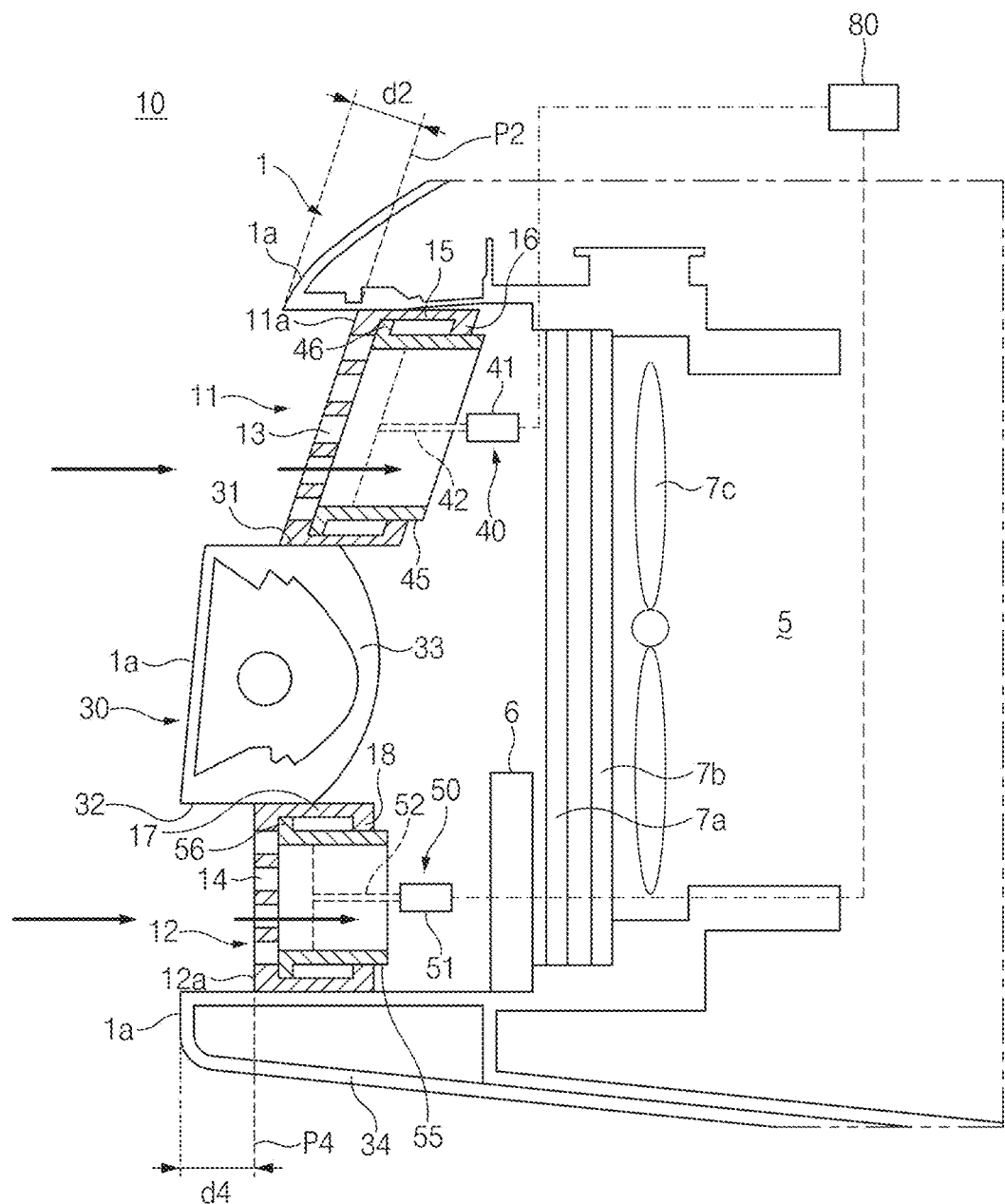
FIG. 3 illustrates a cross-sectional view, taken along line A-A of FIG. 1, in a state in which an upper grille body is in a second position and a lower grille body is in a fourth position.
Figure 4:
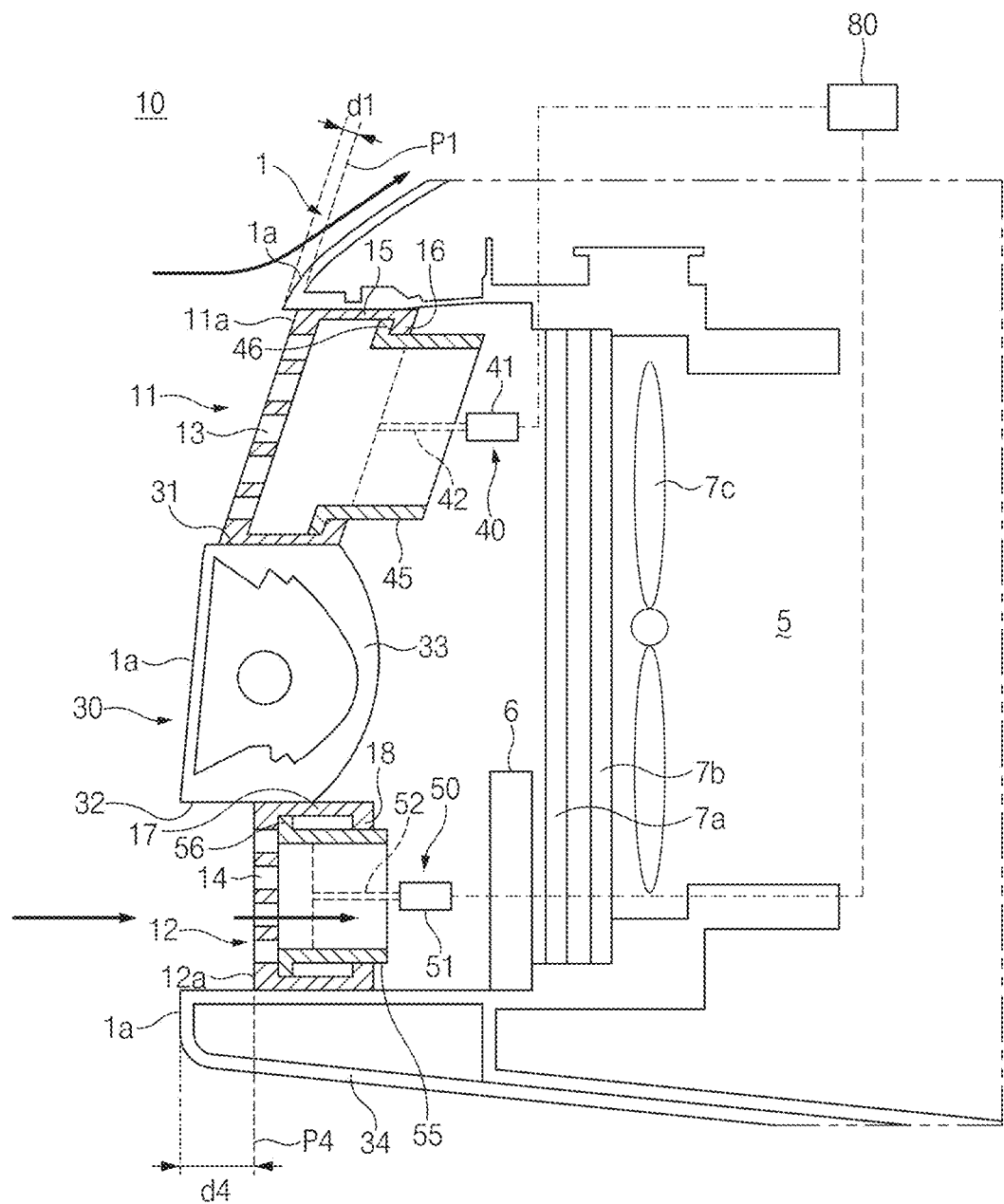
FIG. 4 illustrates a cross-sectional view, taken along line A-A of FIG. 1, in a state in which an upper grille body is in a first position and a lower grille body is in a fourth position.

According to the embodiment illustrated in FIGS. 2 to 4, the intercooler 6 may be located in front of the condenser 7a and the radiator 7b, and the condenser 7a may be located in front of the radiator 7b. According to another embodiment, the condenser 7a may be located behind the radiator 7b. The arrangement of the condenser 7a and the radiator 7b may vary according to vehicle types.

Referring to FIGS. 1 to 4, the front end structure 10 according to an embodiment of the present disclosure may include an upper grille body 11 and a lower grille body 12.

The front end structure 10 according to another embodiment of the present disclosure may include any one of the upper grille body 11 and the lower grille body 12. In other words, the front end structure 10 according to another embodiment of the present disclosure may include only one grille body.

According to an embodiment, the front end body 1 may include a bumper cover 30. The bumper cover 30 may include one or more grille openings 31 and 32 for receiving the grille bodies 11 and 12. The front end surface 1a of the front end body 1 may be defined at the front of the bumper cover 30.

Referring to FIGS. 1 and 2, the bumper cover 30 may have an upper grille opening 31 and a lower grille opening 32. The upper grille opening 31 may receive the upper grille body 11 and the lower grille opening 32 may receive the lower grille body 12.

The bumper cover 30 may have an upper bumper portion 33 adjacent to the upper grille opening 31 and a lower bumper portion 34 adjacent to the lower grille opening 32. The upper bumper portion 33 may be located between the upper grille opening 31 and the lower grille opening 32. The lower bumper portion 34 may be located below the lower grille opening 32. The upper bumper portion 33 and the lower bumper portion 34 may extend in a width direction of the vehicle. A shock absorbing material may be mounted on the inside or rear of the upper bumper portion 33. A shock absorbing material may be mounted on the inside or rear of the lower bumper portion 34.

Referring to FIG. 1, the bumper cover 30 may have a pair of lamp openings 38 and 39. The pair of lamp openings 38 and 39 may be spaced apart from each other in the width direction of the vehicle. Headlamps 8 and 9 may be received in the corresponding lamp openings 38 and 39, respectively.

The upper grille body 11 may be movably received in the upper grille opening 31. The upper grille body 11 may have a plurality of openings 13 that permit the ambient air to flow into an engine compartment. The upper grille body 11 may be movable between a first position P1 (see FIGS. 2, 5, and 6) and a second position P2 (see FIG. 3).

The first position P1 may be a position in which a front surface 11a of the upper grille body 11 is close to the front end surface 1a of the front end body 1.

According to an embodiment, as illustrated in FIG. 2, the first position P1 may be a position in which the front surface 11a of the upper grille body 11 is recessed from the front end surface 1a of the front end body 1 toward the front compartment 5 by a first distance d1. In other words, the front surface 11a of the upper grille body 11 may be spaced apart from the front end surface 1a of the front end body 1 by the first distance d1.

Figure 5:
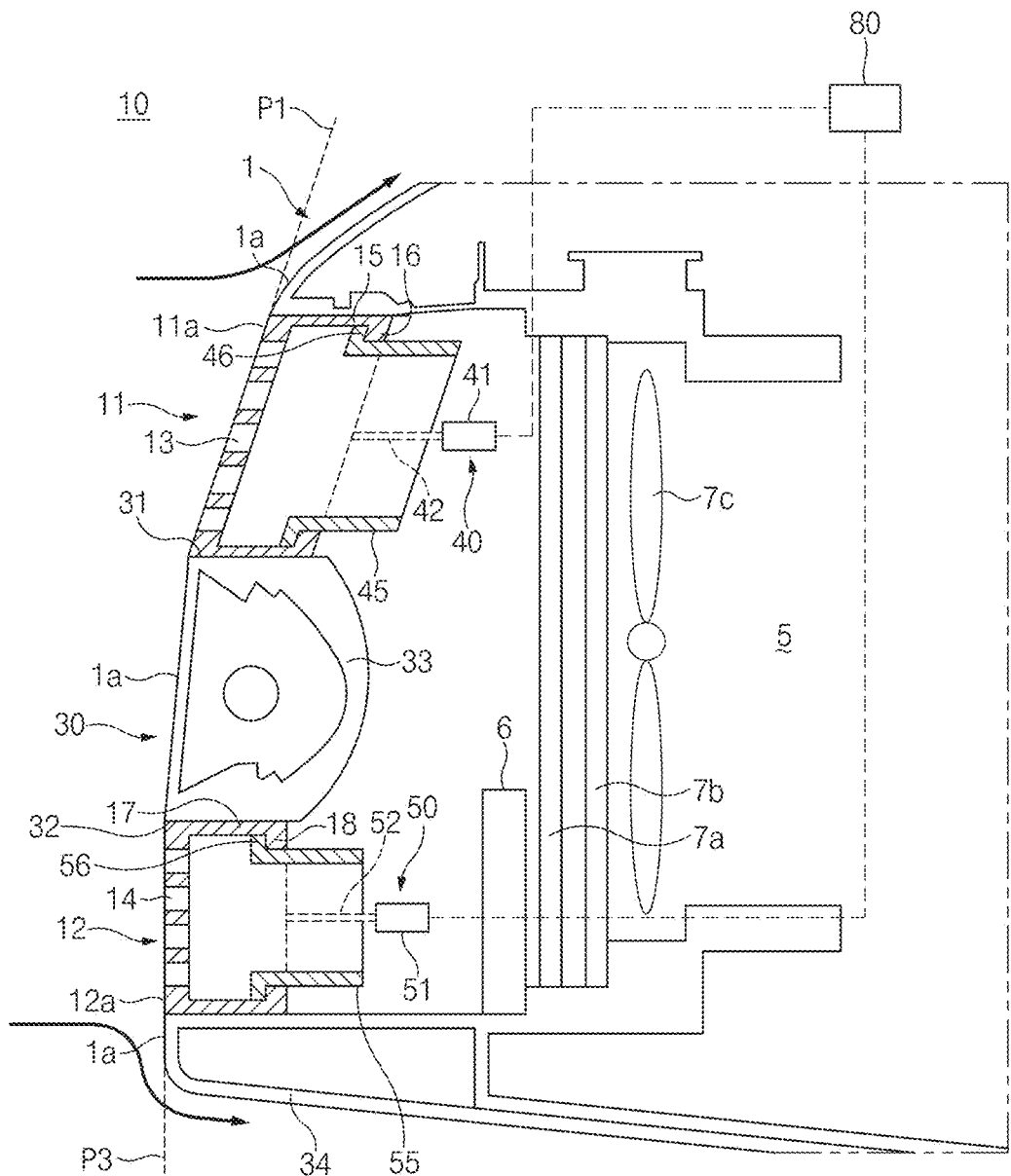
FIG. 5 illustrates a modification to the embodiment of FIG. 2.

According to another embodiment, as illustrated in FIG. 5, the first position P1 may be a position in which the front surface 11a of the upper grille body 11 is substantially flush with the front end surface 1a of the front end body 1. For example, a distance between the front surface 11a of the upper grille body 11 and the front end surface 1a of the front end body 1 may be 0.

Figure 6:
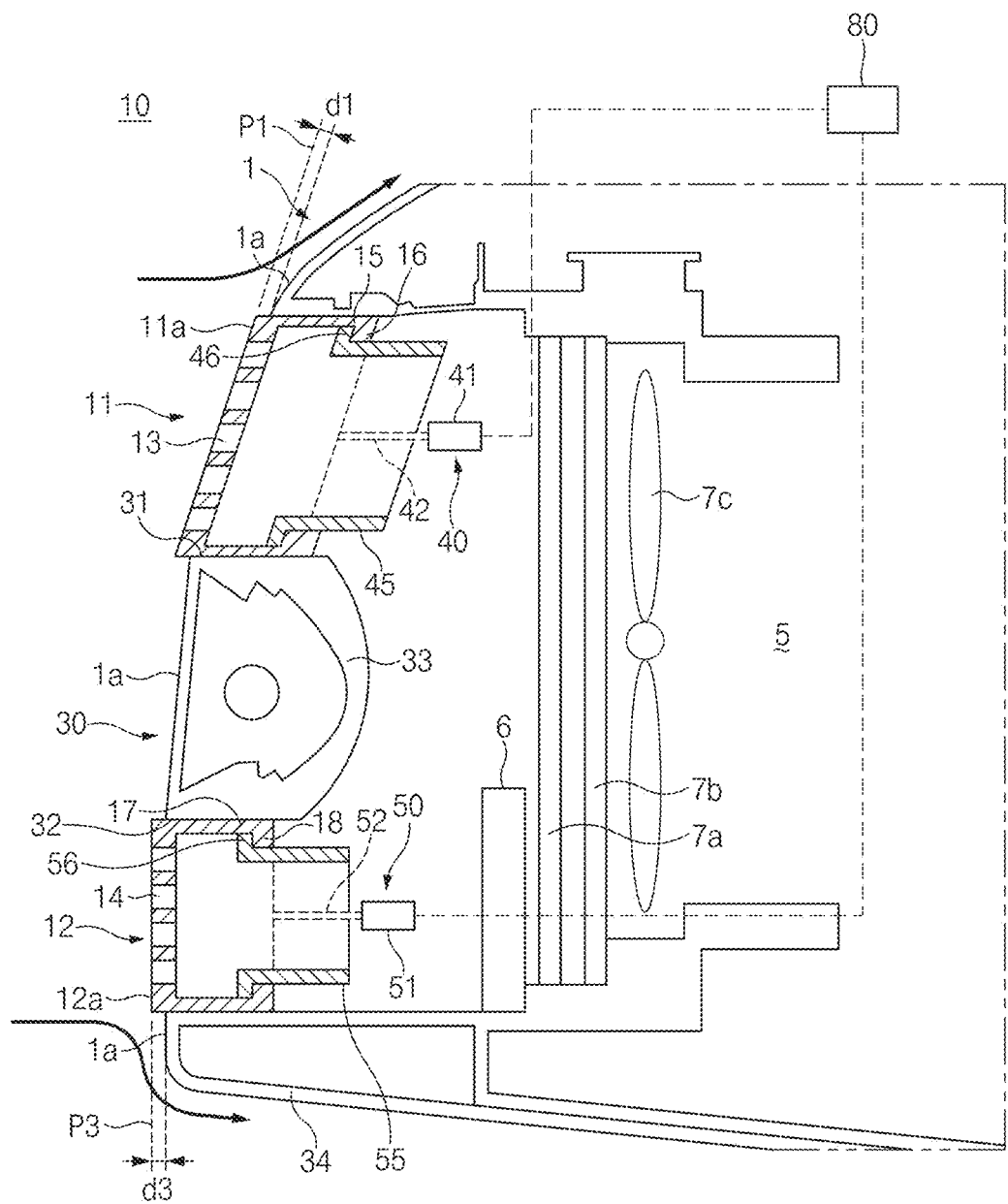
FIG. 6 illustrates another modification to the embodiment of FIG. 2.

According to another embodiment, as illustrated in FIG. 6, the first position P1 may be a position in which the front surface 11a of the upper grille body 11 protrudes from the front end surface 1a of the front end body 1 toward the front of the vehicle by the first distance d1. In other words, the front surface 11a of the upper grille body 11 may be spaced apart from the front end surface 1a of the front end body 1 by the first distance d1.

Referring to FIG. 3, the second position P2 may be a position in which the front surface 11a of the upper grille body 11 is recessed from the front end surface 1a of the front end body 1 toward the front compartment 5 by a second distance d2. In other words, the front surface 11a of the upper grille body 11 may be spaced apart from the front end surface 1a of the front end body 1 by the second distance d2. Referring to FIGS. 2 and 3, the second distance d2 may be greater than the first distance d1.

The movement of the upper grille body 11 may be guided by an upper guide member 45. The upper guide member 45 may be fixedly disposed within the front compartment 5. The upper grille body 11 may have a duct-shaped extension portion 15 extending from a rear end of the upper grille body 11 toward the front compartment 5. As the extension portion 15 is integrally connected to the upper grille body 11, the upper grille body 11 may move together with the extension portion 15. The movement of the extension portion 15 may be guided by the upper guide member 45. The upper grille body 11 may have a projection 16 protruding from a rear end of the extension portion 15 in a height direction of the vehicle.

The upper guide member 45 may have a stopper 46 for restricting a movement position, i.e., limiting movement or travel of the upper grille body 11. Referring to FIG. 2, when the upper grille body 11 moves to the first position P1, the projection 16 of the upper grille body 11 may be brought into contact with the stopper 46 of the upper guide member 45, so that the upper grille body 11 may be precisely restricted to the first position P1. Referring to FIG. 3, when the upper grille body 11 moves to the second position P2, a rear surface of the upper grille body 11 may be brought into contact with the stopper 46 of the upper guide member 45, so that the upper grille body 11 may be precisely restricted to the second position P2.

In addition, the periphery of the extension portion 15 may be sealed by the projection 16 and the stopper 46 so that the leakage of ambient air through the periphery of the extension portion 15 may be prevented. In particular, a sealing member (not shown) may be attached to at least one of the projection 16 and the stopper 46.

The upper grille body 11 may be linearly moved by an upper actuator 40. The upper actuator 40 may move the upper grille body 11 between the first position P1 and the second position P2. For example, the upper actuator 40 may be a hydraulic cylinder having a cylinder tube 41 and a rod 42 which is movable with respect to the cylinder tube 41. An end of the rod 42 may be connected to the extension portion 15 of the upper grille body 11. As another example, the upper actuator 40 may be various actuation structures such as a linear motor, allowing the upper grille body 11 to move linearly.

The lower grille body 12 may be movably received in the lower grille opening 32. The lower grille body 12 may have a plurality of openings 14 that permit the ambient air to flow into the engine compartment. The lower grille body 12 may be movable between a third position P3 (see FIGS. 2, 5, and 6) and a fourth position P4 (see FIG. 3).

The third position P3 may be a position in which a front surface 12a of the lower grille body 12 is close to the front end surface 1a of the front end body 1.

According to an embodiment, as illustrated in FIG. 2, the third position P3 may be a position in which the front surface 12a of the lower grille body 12 is recessed from the front end surface 1a of the front end body 1 toward the front compartment 5 by a third distance d3. In other words, the front surface 12a of the lower grille body 12 may be spaced apart from the front end surface 1a of the front end body 1 by the third distance d3.

According to another embodiment, as illustrated in FIG. 5, the third position P3 may be a position in which the front surface 12a of the lower grille body 12 is substantially flush with the front end surface 1a of the front end body 1. For example, a distance between the front surface 12a of the lower grille body 12 and the front end surface 1a of the front end body 1 may be 0.

According to another embodiment, as illustrated in FIG. 6, the third position P3 may be a position in which the front surface 12a of the lower grille body 12 protrudes from the front end surface 1a of the front end body 1 toward the front of the vehicle by the third distance d3. In other words, the front surface 12a of the lower grille body 12 may be spaced apart from the front end surface 1a of the front end body 1 by the third distance d3.

The fourth position P4 may be a position in which the front surface 12a of the lower grille body 12 is recessed from the front end surface 1a of the front end body 1 toward the front compartment 5 by a fourth distance P4. In other words, the front surface 12a of the lower grille body 12 may be spaced apart from the front end surface 1a of the front end body 1 by the fourth distance d4. Referring to FIGS. 2 and 3, the fourth distance d4 may be greater than the third distance d3.

The movement of the lower grille body 12 may be guided by a lower guide member 55. The lower guide member 55 may be fixedly disposed within the front compartment 5. The lower grille body 12 may have a duct-shaped extension portion 17 extending from a rear end of the lower grille body 12 toward the front compartment 5. As the extension portion 17 is integrally connected to the lower grille body 12, the lower grille body 12 may move together with the extension portion 17. The movement of the extension portion 17 may be guided by the lower guide member 55. The lower grille body 12 may have a projection 18 protruding from a rear end of the extension portion 17 in the height direction of the vehicle.

The lower guide member 55 may have a stopper 56 for restricting a movement of the lower grille body 12. Referring to FIG. 2, when the lower grille body 12 moves to the third position P3, the projection 18 of the lower grille body 12 may be brought into contact with the stopper 56 of the lower guide member 55, so that the lower grille body 12 may be precisely restricted to the third position P3. Referring to FIG. 3, when the lower grille body 12 moves to the fourth position P4, a rear surface of the lower grille body 12 may be brought into contact with the stopper 56 of the lower guide member 55, so that the lower grille body 12 may be precisely restricted to the fourth position P4.

In addition, the periphery of the extension portion 17 may be sealed by the projection 18 and the stopper 56, so that the leakage of ambient air through the periphery of the extension portion 17 may be prevented. In particular, a sealing member (not shown) may be attached to at least one of the projection 18 and the stopper 56.

The lower grille body 12 may be linearly moved by a lower actuator 50. The lower actuator 50 may move the lower grille body 12 between the third position P3 and the fourth position P4. For example, the lower actuator 50 may be a hydraulic cylinder having a cylinder tube 51 and a rod 52 which is movable with respect to the cylinder tube 51. An end of the rod 52 may be connected to the extension portion 17 of the lower grille body 12. As another example, the lower actuator 50 may be various actuation structures such as a linear motor, allowing the lower grille body 12 to move linearly.

The front end structure 10 for a vehicle according to an embodiment of the present disclosure may include a controller 80 for controlling the operation of the upper actuator 40 and the operation of the lower actuator 50. The controller 80 may control the operation of the upper actuator 40 and the operation of the lower actuator 50 depending on the conditions of the vehicle (engine RPM, vehicle speed, torque, navigation information, and the like). For example, the controller 80 may receive information on the conditions of the vehicle (engine RPM, vehicle speed, torque, navigation information, and the like) from a vehicle controller such as an electronic control unit or engine control unit (ECU). As another example, the controller 80 may be integrated with the vehicle controller. The controller 80 may include a processor and a memory. The processor may receive instructions stored in the memory and be programmed to transmit instructions to the upper actuator 40 and the lower actuator 50. The memory may be a data store such as a hard disk drive, a solid state drive, a server, a volatile storage medium, or a non-volatile storage medium.

According to the above-described embodiments of the present disclosure, when the grille bodies 11 and 12 move close to the front end surface 1a of the front end body 1, a pressure acting on the front end surface 1a of the front end body 1 may, and the amount of ambient air flowing into the front compartment 5, may be reduced. This allows the ambient air to flow along the front end surface 1a of the front end body 1, thereby improving aerodynamic performance. When the grille bodies 11 and 12 are recessed from the front end surface 1a of the front end body 1 toward the front compartment 5, a pressure acting on the front end surface 1a of the front end body 1 may be increased. The amount of ambient air flowing into the front compartment 5 may also be increased. This improves the cooling performance with respect to the heat exchangers 6, 7a, and 7b located in the front compartment 5.

The upper grille body 11 and/or the lower grille body 12 may be moved depending on vehicle driving conditions.

Referring to FIG. 2, in a fuel efficiency improving condition in which cooling with respect to the heat exchangers 6, 7a, and 7b located in the front compartment 5 is not required, the upper grille body 11 and the lower grille body 12 may advance so as to be close to the front end surface 1a of the front end body 1.

In detail, when the upper grille body 11 is moved to the first position P1 by the upper actuator 45, the first distance d1 between the front surface 11a of the upper grille body 11 and the front end surface 1a of the front end body 1 may be minimized or be close to 0. At the same time, when the lower grille body 12 is moved to the third position P3 by the lower actuator 55, the third distance d3 between the front surface 12a of the lower grille body 12 and the front end surface 1a of the front end body 1 may be minimized or be close to 0.

As a result, the ambient air may be uniformly distributed throughout the front surfaces 11a and 12a of the grille bodies 11 and 12 and the front end surface 1a of the front end body 1. Since the pressure (static pressure) acting on the front surfaces 11a and 12a of the grille bodies 11 and 12 and the front end surface 1a of the front end body 1 is relatively reduced, the ambient air may flow to the upper and lower sides of the vehicle along the front surfaces 11a and 12a of the grille bodies 11 and 12 and the front end surface 1a of the front end body 1, and thus cooling drag (CD) may be improved by approximately 13%. The cooling drag (CD) is a difference between drag Do in a state in which the openings of the grille body are opened and drag Dc in a state in which the openings of the grille body are closed (CD=Do−Dc).

Referring to FIG. 3, in a cooling condition in which cooling with respect to the heat exchangers 6, 7a, and 7b located in the front compartment 5 is required, the upper grille body 11 and the lower grille body 12 may be retracted so as to be recessed from the front end body 1 toward the front compartment 5.

In detail, when the upper grille body 11 is moved to the second position P2 by the upper actuator 45, the second distance d2 between the front surface 11a of the upper grille body 11 and the front end surface 1a of the front end body 1 may be greater than the first distance d1. At the same time, when the lower grille body 12 is moved to the fourth position P4 by the lower actuator 55, the fourth distance d4 between the front surface 12a of the lower grille body 12 and the front end surface 1a of the front end body 1 may be greater than the third distance d3. In other words, as the upper grille body 11 and the lower grille body 12 are retracted so as to be recessed from the front end surface 1a of the front end body 1 toward the front compartment 5, an air pocket space may be formed at the front surface 11a of the upper grille body 11 and the front surface 12a of the lower grille body 12. As a result, the ambient air may be concentrated on the front of the upper grille body 11 and the front of the lower grille body 12. The pressure (static pressure) acting on the front surface 11a of the upper grille body 11 and the pressure (static pressure) acting on the front surface 12a of the lower grille body 12 may be relatively increased. Thus, the ambient air may easily flow into the front compartment 5 through the openings 13 of the upper grille body 11 and the openings 14 of the lower grille body 12. This increases the amount of ambient air flowing into the front compartment 5, i.e., a cooling air flow rate. For example, when the second distance d2 and the fourth distance d4 are approximately 40 mm, the cooling air flow rate may be increased by approximately 4.5%. When the ambient air flows into the front compartment 5 through the openings 13 and 14 of the upper grille body 11 and the lower grille body 12, the heat exchangers such as the intercooler 6, the condenser 7a, and the radiator 7b may be cooled, so that heat damage may be prevented.

Referring to FIG. 4, in a driving condition of the vehicle (the internal combustion engine vehicle) for increasing the output of the internal combustion engine, it is necessary to increase the amount of ambient air passing through the intercooler 6. In this case, the lower grille body 12 adjacent to the intercooler 6 may be retracted so as to be recessed from the front end body 1 toward the front compartment 5 and the front surface 11a of the upper grille body 11 may advance so as to be close to the front end surface 1a of the front end body 1.

In detail, when the upper grille body 11 is moved to the first position P1 by the upper actuator 45, the first distance d1 between the front surface 11a of the upper grille body 11 and the front end surface 1a of the front end body 1 may be minimized or be close to 0. At the same time, when the lower grille body 12 is moved to the fourth position P4 by the lower actuator 55, the fourth distance d4 between the front surface 12a of the lower grille body 12 and the front end surface 1a of the front end body 1 may be greater than the third distance d3. Thus, the amount of ambient air flowing into the front compartment 5 through the openings 14 of the lower grille body 12, i.e., the cooling air flow rate may be relatively increased, so that the cooling performance of the intercooler 6 may be improved.

As set forth above, according to embodiments of the present disclosure, as the grille body having the plurality of openings is movable with respect to the front end body of the vehicle in the longitudinal direction (or driving direction) of the vehicle, a pressure acting on the front end surface of the front end body may be varied, so that aerodynamic performance and cooling performance may be selectively improved.

According to embodiments of the present disclosure, when the grille body moves close to the front end surface of the front end body, the pressure acting on the front end surface of the front end body, and the amount of ambient air flowing into the front compartment, may be reduced. This allows the ambient air to flow along the front end surface of the front end body, thereby improving aerodynamic performance.

According to embodiments of the present disclosure, when the grille body is recessed from the front end surface of the front end body toward the front compartment, the pressure acting on the front end surface of the front end body, and the amount of ambient air flowing into the front compartment, may be increased. This improves the cooling performance with respect to the heat exchangers located in the front compartment.

Although the present disclosure has been described with reference to embodiments and the accompanying drawings, the present disclosure is not limited thereto, but may be variously modified and altered by those having ordinary skill in the art to which the present disclosure pertains without departing from the spirit and scope of the present disclosure claimed in the following claims.

What is claimed is:

1. A front end structure for a vehicle, the front end structure comprising:
   a front end body having a front end surface;
   a grille body having a plurality of openings and mounted to be movable with respect to the front end body; and
   a guide member configured to guide a movement of the grille body,
   wherein the front end body has a front compartment configured to receive a plurality of heat exchangers,
   wherein the grille body has an extension portion extending toward the front compartment, and
   wherein a movement of the extension portion is guided by the guide member.

2. The front end structure according to claim 1, wherein the grille body is movable between a position close to the front end surface of the front end body and a position recessed from the front end surface of the front end body.

3. The front end structure according to claim 1, wherein the guide member has a stopper configured to restrict a movement position of the grille body.

4. The front end structure according to claim 1, further comprising an actuator configured to move the grille body.

5. The front end structure according to claim 1, wherein the front end body includes a bumper cover.

6. The front end structure according to claim 5, wherein the bumper cover has a grille opening, and the grille body is movably received in the grille opening.

7. The front end structure according to claim 6, wherein the bumper cover has a bumper portion adjacent to the grille opening.

8. The front end structure according to claim 4, further comprising a controller to control the actuator to move the grille body depending on conditions of the vehicle.

9. A front end structure for a vehicle, the front end structure comprising:
   a front end body having a front end surface;
   a grille body having a plurality of openings and mounted to be movable with respect to the front end body;
   an actuator configured to move the grille body; and
   a controller to control the actuator to move the grille body depending on conditions of the vehicle.

* * * * *